a12) United States Patent
Kenmochi

(10) Patent No.: US 7,293,084 B1
(45) Date of Patent: Nov. 6, 2007

(54) NETWORK CONTENTS MANAGING SYSTEM

(75) Inventor: Akihisa Kenmochi, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 09/717,415

(22) Filed: Nov. 21, 2000

(30) Foreign Application Priority Data

Nov. 25, 1999 (JP) .................................. 11-334621

(51) Int. Cl.
*G06F 15/173* (2006.01)

(52) U.S. Cl. ..................................................... 709/224

(58) Field of Classification Search ................. 709/200, 709/203, 219, 235, 245, 224
See application file for complete search history.

(56) References Cited

U.S. PATENT DOCUMENTS

| | | | | |
|---|---|---|---|---|
| 5,434,775 | A * | 7/1995 | Sims et al. ..................... | 705/8 |
| 5,655,081 | A * | 8/1997 | Bonnell et al. ............. | 709/202 |
| 6,253,198 | B1 * | 6/2001 | Perkins .......................... | 707/3 |
| 6,356,947 | B1 * | 3/2002 | Lutterschmidt ............. | 709/231 |
| 6,370,587 | B1 * | 4/2002 | Hasegawa et al. .......... | 709/245 |
| 6,415,289 | B1 * | 7/2002 | Williams et al. ............. | 707/10 |
| 6,438,563 | B1 * | 8/2002 | Kawagoe ..................... | 707/201 |
| 6,560,611 | B1 * | 5/2003 | Nine et al. ................. | 707/104.1 |
| 6,574,197 | B1 * | 6/2003 | Kanamaru et al. .......... | 370/252 |
| 6,631,409 | B1 * | 10/2003 | Watson et al. .............. | 709/224 |
| 6,769,022 | B1 * | 7/2004 | DeKoning et al. .......... | 709/223 |
| 6,970,919 | B1 * | 11/2005 | Doi et al. ................... | 709/220 |
| 7,024,450 | B1 * | 4/2006 | Deo et al. ................... | 709/203 |
| 2002/0002606 | A1 * | 1/2002 | Jaffe ........................... | 709/223 |
| 2002/0035620 | A1 * | 3/2002 | Takahashi et al. .......... | 709/220 |

FOREIGN PATENT DOCUMENTS

| | | |
|---|---|---|
| JP | 06-266762 | 9/1994 |
| JP | 09-198295 | 7/1997 |
| JP | 09-204442 | 8/1997 |
| JP | 10-269087 | 10/1998 |
| JP | 11-065911 | 3/1999 |
| JP | 11-184825 | 7/1999 |

* cited by examiner

*Primary Examiner*—Nathan J. Flynn
*Assistant Examiner*—J. Bret Dennison
(74) *Attorney, Agent, or Firm*—Scully, Scott, Murphy & Presser, P.C.

(57) ABSTRACT

The present invention provides a network contents managing system on a network comprising: a contents database retaining locations and attributes of contents and data; a retrieval request detection unit for detecting a retrieval request to the contents database and outputting a retrieval request information; a network monitoring unit for monitoring a change of an apparatus connection state to the network and, upon occurrence of a change of the connection state, outputting a new apparatus connection state as a connection state information; a contents monitoring unit for outputting a contents modification information when a location and an attribute of contents and data is modified; a database retrieval unit for retrieving the contents database upon reception of the retrieval request information and outputting a retrieval result information; a database managing unit for performing registration and modification in the contents database upon reception of the connection state information and the contents modification information; and a retrieval result output unit for outputting the retrieval result information to the apparatus which has made the retrieval request. Thus, it is possible to dynamically grasp the client apparatus connection state and the contents modification.

19 Claims, 7 Drawing Sheets

NETWORK CONTENTS MANAGING SYSTEM

BACKGROUND OF THE INVENTION

1. Field of the Invention

The present invention relates to a system for managing multimedia contents stored in storage mediums mounted in network connected apparatuses and in particular, to a system for managing multimedia contents in a network in which apparatus connection and disconnection and storage mediums mounting and removal are dynamically performed.

2. Description of the Related Art

Conventionally, a multimedia server based on the server-client system has been used to store and serve multimedia contents in network connect apparatuses. In such a server, when a new content is stored, a new link information to the content should be created and transmitted to clients on the network so that a new content becomes accessible for clients. In such a multimedia server, each time a content is stored, the server should send a new link information to all clients, which requires higher processing and network load as the number of clients increases. If such link information management is not automatically performed, a system administrator should make considerable effort to maintain the link information.

As a conventional technique to solve these problems, for example, Japanese Patent Publication 9-198295 incorporates a directory server for separately managing contents location information as directory information. With this, a client can rapidly obtain the latest directory information by requesting to the directory server.

The aforementioned method can be used to solve the problems when there is a server or a directory server performing a service to provide an information to access contents. However, in a network including personal computers, portable terminals, storage apparatuses, and the like, especially in a home network, problems as follows are caused.

One of the problems is that the apparatus providing a directory service may not be operating and in that case the directory service is not available. This problem is also caused when an apparatus providing the directory service is abruptly turned off or when none of the apparatuses has resources enough to provide the directory service.

Moreover, the apparatus storing contents may not operate at all times or the removable storage medium may be removed at any time. Accordingly, the contents required by a user may not always exist in the storage mediums in operating apparatuses connected to a network. In such a case, the contents cannot be available.

SUMMARY OF THE INVENTION

It is therefore an object of the present invention to provide a network contents managing method and system capable of retrieving a location and a availability of contents and data in a network including personal computers, portable terminals, recording apparatuses, and the like, especially in a home network, regardless of storing and deleting contents in the networked apparatuses, connection/disconnection of an apparatus to/from the network, on/off state of the apparatuses connected to the network, and attached/detached state of a removable medium storing contents.

Another object of the present invention is to provide a network contents managing method and system capable of obtaining a list of contents and data stored in networked apparatuses so that a user can know which apparatus should be turned on or which storage medium should be attached when an apparatus storing the required contents and data is off or the storage medium containing the contents and data is removed.

Still another object of the present invention is to provide a network contents managing method and system which can solve the problem that a specific apparatus should keep on running in order to provide the directory service and that the directory service does not become available when the directory server has failed and is to be repaired.

Yet another object of the present invention is to provide a network contents managing method and system which enable to update a contents database with new contents and data stored in a newly connected or reconnected apparatus to the network so as to enable the contents and data accessible in the network.

The network contents managing system according to the present invention is applicable to a network including a personal computer, portable terminals, storage apparatuses, set top boxes, and the like, the system comprising: a contents database retaining locations and attributes of contents and data stored in different apparatuses connected to the network; a retrieval request detection unit for detecting a retrieval request to the contents database and outputting a retrieval request information; a network monitoring unit for monitoring the state of an apparatus connection to the network and, upon occurrence of a change of the connection state, outputting a new apparatus connection state as a connection state information; a contents monitoring unit for outputting a contents modification information when the location and the attribute of contents and data is modified in any of the apparatuses connected to the network such as recording, moving, and deletion of contents and data; a database retrieval unit for retrieving the contents database upon reception of the retrieval request information and outputting a retrieval result information; a database managing unit for performing registration and modification in the contents database upon reception of the connection state information and the contents modification information; and a retrieval result output unit for outputting the retrieval result information received from the database retrieval unit, to the apparatus which has made the retrieval request.

Moreover, the network contents managing system according to the present invention is further characterized in that the contents modification information also includes locations and attributes of the contents and data modified by mounting/removal of a removal storage medium.

Moreover, the network contents managing system according to the present invention is characterized in that the network monitoring units detects a power state of each apparatus connected to the network and updates respective power state information retained in the contents database.

Moreover, the network contents managing system according to the present invention further comprises a power state monitoring unit for monitoring a power state of an apparatus connected to the network and a remote start unit for activating at least one of the contents database, the retrieval request detection unit, the network monitoring unit, the database retrieval unit, the database managing unit, and the retrieval result output unit, so as to provide directory service function by distributed or non-distributed operation of these units.

Moreover, the network contents managing system according to the present invention further comprises a power remote operation unit for turning on/off another apparatus connected to the network.

The network contents managing system according to the present invention further comprises a database editing unit for enabling a user to edit the contents database.

DESCRIPTION OF THE PREFERRED EMBODIMENTS

Embodiment 1

Figure 1:
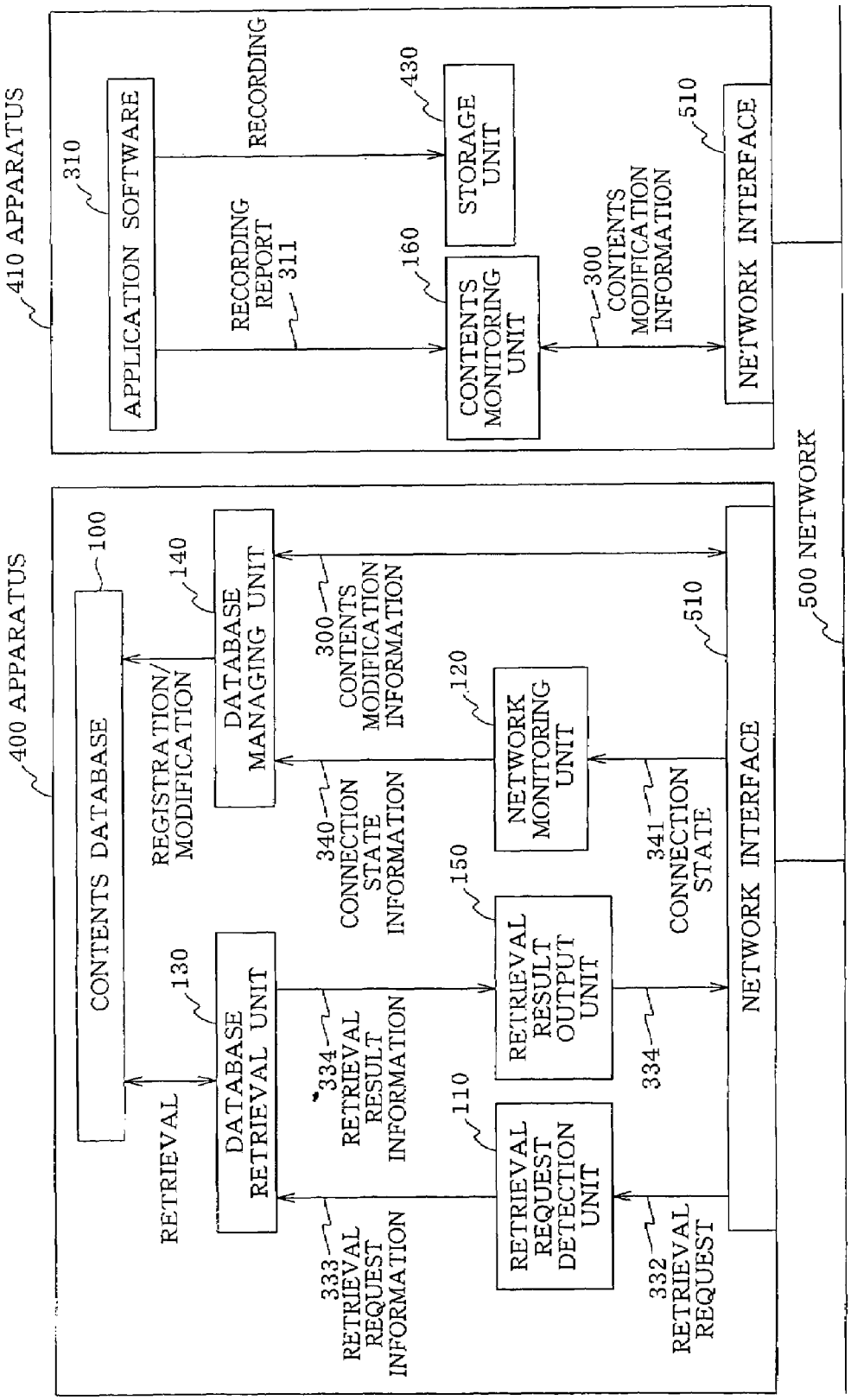
FIG. 1 is a block diagram showing a configuration of a network contents managing system according to a first embodiment of the present invention.

FIG. 1 shows a network contents managing system according to a first embodiment of the present invention.

As shown in FIG. 1, the system of the present invention includes an apparatus 400, an apparatus 410, and a network 500. It is assumed that a contents database 100, a retrieval request detection unit 110, a network monitoring unit 120, a database retrieval unit 130, a database managing unit 140, and a retrieval result output unit 150 operate in the apparatus 400. Moreover, it is assumed that a contents monitoring unit 160 operates in the apparatus 410 recording contents by an application software 310. The apparatus 400 and the apparatus 410 are connected to the network 500. Each of the apparatus 400 and the apparatus 410 is provided with a network interface 510. Next, explanation will be given on operation of the present embodiment.

Firstly, a new content is recorded on a storage unit 430 in the apparatus 410 by the application software 310 operating in the apparatus 410. The storage unit 430 is, for example, a hard disk drive or a external storage apparatus connected to the apparatus 410. The application software 310 starts recording contents, triggered by the user operation or the recording preservation function of the software.

The contents monitoring unit 160 detects recording of the new content by receiving a report 311 from the application software, or detecting a system event accompanying the file recording by the application software 310, or detecting a creation of a new file, and outputs a contents modification information 300. A newly recorded content may be, for example, a satellite broadcast program or a terrestrial television program or data. In these cases, the electronic program guide (hereinafter, referred to as EPG) is often available from satellite broadcasting or the Internet and utilized to receive such programs. The EPG usually contains a program title, broadcast start/end date and time, genre information, and the like for each of the programs.

Next, the contents monitoring unit 160 receives the EPG information from the application software 310 and outputs a contents modification information 300. The contents modification information 300 contains a value or character string indicating a new registration, location and attribute of the recorded content or data. For indicating the location of the new content or data, for example, an ID number of apparatus name identifying the apparatus 410 on the network 500 and a file name including a path in the hard disk drive in the apparatus 410 are used. The ID number identifying the apparatus 410 is, for example, an Internet Protocol(IP) address if the network is based on IP network or a value inherent to the apparatus such as GUID (global unique identifier) of the apparatus if the network is an IEEE1394-1995 network. In case that a new content is recorded on a removable storage medium, an ID number or a name identifying the medium is further used. For example, if a removable hard disk drive unit has an ID number inherent to itself, the ID number is used, and if a medium such as a video tape not having an inherent ID number is used, a serial number or the like is used.

As the attribute of the recorded contents, the modification information 300 may contain the information including the EPG information and more as follows.

Program title
Broadcast start/end date and time
Genre
Content type (video, audio, data, or the like)
Recording date and time
Apparatus preferable/necessary to reproduce the contents
Apparatus state
Pay information (Fee charged for one listening/watching and charging method, for example, pay-per-view, pay-per-day, or the like)
Rights management information (whether recording is permitted and how many generations of copying are allowed)

Here, the apparatus state is a flag indicating, for example, whether the apparatus is connected to or disconnected from the network, and whether the apparatus power is on or off, and whether the apparatus can serve contents or not. The contents monitoring unit 160 outputs the aforementioned contents modification information 300 via the network interface 510 to the network 500. As the destination of the contents modification information 300, it is possible to specify the apparatus 400 or all the apparatuses on the network. When the apparatus 400 is specified as the destination, for example, the IP address can be used for the IP network or the GUID for the 1394 network. When the destination is all the apparatuses on the network, for example, it is possible to use the broadcast to the network.

When the contents modification information 300 is output by the apparatus 410 to the network 500, the apparatus 400 receives the contents modification information 300 through the network interface 510.

If the apparatus 400 have informed the apparatuses on the network that the apparatus 400 is the destination apparatus of the contents modification information 300, the apparatus 410 transmits the contents modification information 300 only to the apparatus 400. For this, during the start up process of the database managing unit 140 in the apparatus 400, the database managing unit 140 transmits, for example, the IP address or GUID of the apparatus 400 as the destination of the contents modification information 300, to the all apparatuses on the network. The apparatus 410 receives and retains the destination as the transmission destination information 320 in the contents monitoring unit 160. In this case, the database managing unit 140 of the apparatus 400 receives all the contents modification information 300 transmitted on the network, which enables the apparatus 400 to work as a directory server on the network.

The database managing unit 140 of the apparatus 400 receives the contents modification information 300 through the network interface 510 and adds the data of the contents modification information 300 including the content location, program title, broadcast start/end date and time, genre of the contents or data, and the like all collected as a database record, to a contents database 100. Here, the contents database record may include a record ID number for managing the contents and data. The record ID number is represented, for example, by a serial number in all the contents and data or a set of the apparatus ID number and a serial of the content stored in each apparatus.

The contents database 100 contains the database records. Each record consists of the attribute of the contents and data which have been stored in the storage units in all the apparatuses on the network including removable storage mediums.

Here, all the apparatuses on the network represent apparatuses connected to the network including those whose power are off. The attribute of the contents and data is similar to that of the contents modification information 300. If an database record attribute is not specified by the contents modification information 300, the attribute is filled with "no attribute" or left empty.

The database managing unit 140 retains an ID number or name identifying a removable storage medium as a part of the contents database, apart from the records of the contents and data. For a removable storage medium capable of retaining an ID number or name of the medium itself, when a content is stored on the medium for the first time, the database managing unit 140 determines an ID number or name of the medium. If the medium is mounted on different apparatus to that hosting the database managing unit 140, the database managing unit 140 transmits the ID number or name to an apparatus on which the storage medium is mounted, so that the ID number or name is stored in the storage medium. Thus, when a contents recording is performed on the same storage medium for the second time and after, the ID number or name can be fetched from the storage medium. When the storage medium itself such as an ordinary VHS video cassette tape cannot store an ID number or name, the user should input it to the contents database 100. This will be detailed later as another embodiment.

When the new content and data are recorded as has been described above, the contents database 100 can be updated. There are six cases of accessing the contents database 100 according to the contents modification information 300 excluding the case when a new content or data is recorded.

(1) when deleting a content or data which has been recorded (2) when retrieving contents and data (3) when connecting an apparatus containing contents and data, to the network (4) when disconnecting an apparatus containing contents and data, from the network (5) when mounting a removable storage medium (6) when removing a removable storage medium Hereinafter, explanation will be given on operation of the respective components according to the present embodiment in the aforementioned six cases (1) to (6). It should be noted that a detailed explanation will be given later as another embodiment concerning the method for continuing the retrieval function according to the present invention when disconnecting from the network an apparatus having the contents database 100 and the apparatus in which the respective components are operating in the present invention.

(1) Deleting Stored Contents or Data

When a content or data is deleted in an apparatus connected to the network 500, the contents monitoring unit 160 detects a deletion and outputs the contents modification information 300. In this case, the contents modification information 300 contains a value or character string indicating the deletion and attributes of the recorded contents and data.

Upon reception of the contents modification information 300, the database managing unit 140 retrieves a corresponding record from the contents database 100 and deletes the database record.

(2) Retrieving Contents and Data

When retrieving a content and data retained in an apparatus connected to the network 500, firstly, the retrieval application software accepts a retrieval keywords from the user and issues a retrieval request 332. According to the keywords, the retrieval request 332 includes a retrieval condition concerning an arbitrary item among the attribute items of the contents database 100. The retrieval condition is specified, for example, as "item=apparatus state, condition=connected and power on". When the retrieval request detecting unit 110 is operating within the same apparatus as shown in FIG. 1, the retrieval request 332 is detected by that retrieval request detecting unit 110. When the retrieval request detecting unit 110 is not operating within the same apparatus, the retrieval request 332 is sent to the network 500 as a broadcast message. In either of the cases, the retrieval request 332 is detected by an apparatus operating on the network and the apparatus outputs a retrieval request information 333.

The retrieval request information 333 is received by the database retrieval unit 130 operating within the same apparatus or in any of the apparatuses operating on the network. The database retrieval unit 130 uses the attributes contained in the retrieval request information 333 and the condition concerning the attributes to retrieve the contents database 100 within the same apparatus or in any of the apparatuses on the network. When a content or data corresponding to the condition is found, the database retrieval unit 130 fetches the location and attributes of the content or data and passes them as an retrieval result information 334 to a retrieval result output unit 150. If no content or data corresponding to the condition is found, the database retrieval unit 130 passes a value or character string indicating that the requested content or data was not found, as the retrieval result information 334 to the retrieval result output unit 150.

The retrieval result output unit 150 transmits the retrieval result information 334 from the database retrieval unit 130, to the apparatus which has issued the retrieval request 332 or broadcasts it on the network.

As has been described above, the content or data corresponding to the condition specified by the user can be retrieved. For example, when the retrieval request 332 is made with specification of recording date and time such as "item=recording date and time, condition=latest 3 days", it is possible to obtain a list of contents recorded in the network for the latest three days. Furthermore, if the retrieval request 332 is made with specification of "item=apparatus state, condition=connected and power off", it is possible to obtain a list of contents recorded in the apparatuses which have been connected to the network but whose power have been off for the latest three days.

(3) Connecting an Apparatus Retaining Contents and Data to the Network

Explanation will be given on a case of reconnecting an apparatus to the network 500. If a network apparatus having stored contents and data is disconnected, the contents and data in the apparatus does not become available for other apparatuses in the network. When the apparatus is again connected to the network 500, the contents and data in the apparatus should become available. Recovering the availability of the contents and data is realized as follows.

The fact that the apparatus has been connected to the network 500 can be detected by installing a plug-and-play middle-ware such as Jini, HAVi (home audio video interoperability), Universal Plug and Play, in each apparatus on the network. These middle-wares uses broadcast messages or issues event messages to notify the other apparatuses on the network of the connection of an apparatus. In the case of the IEEE1394-1995 network, when a new apparatus is connected, a bus reset occurs so that the network topology is automatically re-configured. The network monitoring unit 120 detects these messages or events to detect an apparatus connection.

Upon detection of an change of connection state 341 of an networked apparatus, the network monitoring unit 120 fetches a new apparatus connection state and outputs the connection state information 340 including an ID number, an apparatus type, and power state of the apparatus connected and the like, to the network 500. The network monitoring unit 120 periodically checks the network apparatus configuration in case that an apparatus connection cannot be reported by the network, the operating system, and the middle-ware. Moreover, in a home network which may be connected by a network capable of detecting the apparatus connection/disconnection separately from the power on/off such as the 1394 network, the connection state information 340 indicates the apparatus connection/disconnection separately from the power on/off state.

The database managing unit 140 receives the connection state information 340 output from the network monitoring unit 120 and compares the apparatus ID numbers contained in the new connection state information 340 to the apparatus ID numbers retained in the contents database 100. The comparison makes it possible to find the apparatus ID number which is contained in the new connection state information 340 but not contained in the contents database 100 and to identify the apparatus which is reconnected to the network. The database managing unit 140 retrieves the contents database 100 by the condition of the apparatus ID number reconnected to the network and modifies the apparatus state flag among the database record attributes to a value or character string indicating "usable". Thus, it becomes possible to access the contents and data which have been recorded in the apparatus reconnected to the network.

It is also possible that the network monitoring unit 120 itself has two buffers, one for storing the apparatus connection state before changing connection and the other for fetching the apparatus connection state after changing, so as to obtain a difference between buffered information by comparing the buffered information. In such a case, if the difference is output as the connection state information 340, the database managing unit 140 can retrieve the contents database 100 and modify the attribute of the corresponding database record as described above.

(4) Disconnecting an Apparatus Retaining Contents and Data from the Network

The method for detecting a connection state change on the network 500 and fetching a new connection state 341 is similar to the aforementioned case when a new apparatus is connected to the network 500. The network monitoring unit 120 detects a connection state change by using the aforementioned middle-ware enabling the plug-and-play in the network 500 or by periodically monitoring the network apparatus configuration and outputs the connection state information 340 including the apparatus ID number of the newly connected apparatus according to the connection state 341.

The database managing unit 140 receives the connection state information 340 output from the network monitoring unit 120 and compares the apparatus ID numbers contained in the new connection state information 340 to the apparatus ID numbers retained in the contents database 100. The comparison finds the ID number which is contained in the contents database 100 but not contained in the latest connection state information 340, thereby enabling to identify an apparatus ID number which has been disconnected from the network. The contents database is retrieved by the condition of the obtained ID number and in the database record having the corresponding apparatus ID number, the flag indicating whether the apparatus can be used currently is modified to a value or character string indicating "cannot be used". After the record attribute is modified, the database managing unit 140 deletes the ID number of the apparatus disconnected from the network, from the apparatus ID numbers retained in the database.

As has been described above, when an apparatus retaining contents and data is disconnected from the network, the contents database 100 can be updated. Since the database record of the contents and data itself remains in the contents database 100, retrieval can find that the apparatus is in the state not usable. Furthermore, when the apparatus which has been disconnected from the network 500 is again connected, as has been described above, the contents and data are reset to the state usable.

(5) Mounting a Removable Storage Medium

A removable storage medium includes all the detachable media capable of recording contents and data such as a cassette tape, a magnetic disc, a magneto-optical disc, a memory card, a CD-R, a CD-RW, a DVD-RAM, and the like. When a removable storage medium containing contents and data is mounted on an apparatus, firstly, the contents monitoring unit 160 detects the mounting of the removable medium and outputs the contents modification information 300. In this case, the contents modification information 300 includes an apparatus ID number or name, a medium ID number or name, and a value or character string indicating attach/detach of the medium. It should be noted that the medium ID number or name is contained in the contents modification information 300 if the medium has a medium ID number or name.

Upon reception of the contents modification information 300, the database managing unit 140 retrieves to find whether the medium ID number or name has been registered in the contents database 100. If registered, the contents database 100 is retrieved with the condition of the medium ID number or name contained in the contents modification information 300, and among the attributes in the matched database record, the flag of usable/not usable is modified to a value or character string indicating "usable". Moreover, the database managing unit 140 replaces the location attribute of the database record with the apparatus ID number or name contained in the contents modification information 300. If the medium ID number or name contained in the contents modification information 300 has not been registered in the contents database 100, the medium ID number or name is newly registered. When the medium retains an attribute information of the contents and data recorded in the medium, the database managing unit 140 creates a new database record having the medium ID number or name as an attribute and the apparatus ID number or name as the location. When the medium has no attribute information of the recorded contents and data, the user should enter such attributes manually, which will be detailed later as an another embodiment.

Thus, when a removable storage medium containing contents and data is mounted, the contents database 100 can be updated.

(6) When Removing a Removable Storage Medium

When a removable storage medium containing contents and data is removed from an apparatus, firstly, the contents monitoring unit 160 detects a removal of the removable storage medium and outputs the contents modification information 300. In this case, the contents modification information 300 includes the medium ID number or name, the apparatus ID number or name, and a value or character string indicating a storage medium removal.

Upon reception of the contents modification information 300, the database managing unit 140 retrieves the contents database 100 with the condition of the medium ID number contained in the contents modification information 300 and modifies, in the attributes of the matched database record, the flag indicating whether usable/unusable to the value of character string indicating "unusable".

As has been described above, when a removable storage medium retaining contents and data is removed, the contents database 100 can be updated. Here, the database record itself remains in the contents database 100 and upon retrieval, the state attribute is found to be unusable. Furthermore, the medium ID number can also be obtained as a result of the retrieval and accordingly, when the corresponding storage medium is mounted, the contents become usable state in the same way as when the apparatus is reconnected to the network.

Embodiment 2

Figure 2:
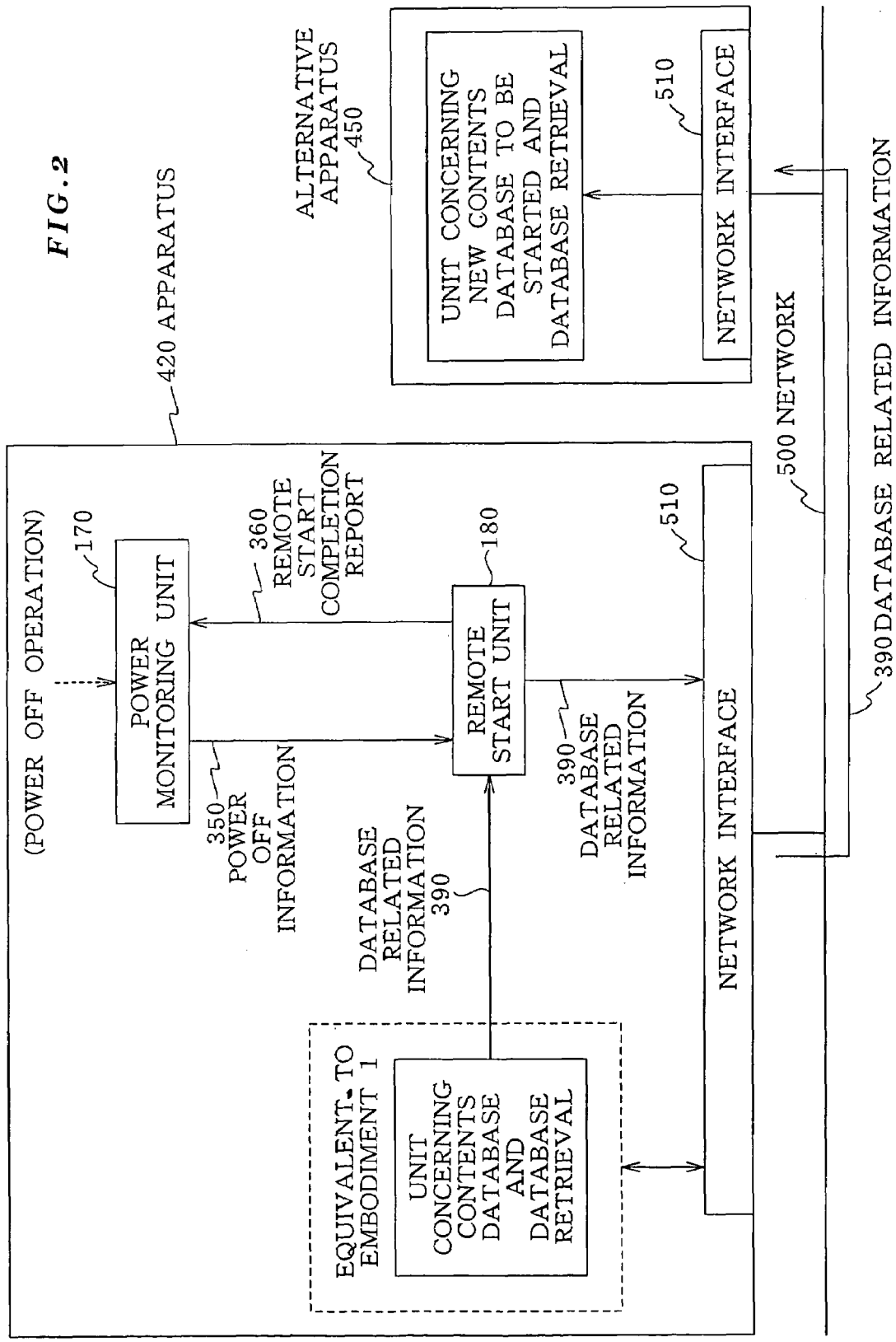
FIG. 2 is a block diagram showing a configuration of a network contents managing system according to a second embodiment of the present invention.

FIG. 2 shows a configuration of a network contents managing system according to a second embodiment of the present invention.

As shown in FIG. 2, the second embodiment of the present invention is based on the first embodiment, augmented by a power monitoring unit 170 for monitoring the apparatus power on/off operation and a remote start unit 180 for activating the components of the present invention retained in another apparatus. The second embodiment differs from the first embodiment only in the operation of the power monitoring unit 170 and the operation of the remote start unit 180. Hereinafter, explanation will be given operations of these components.

The power monitoring unit 170 detects when the apparatus 420 is turned off by the user and outputs a power off information 350.

The remote start unit 180, upon reception of the power off information 350, firstly, suspends the actual power off of the apparatus 420. Next, the remote start unit 180 seeks another apparatus which can operate the components which have been operating in the apparatus 420. In this seek, check is made on each of the apparatuses whether they have, for example, a sufficient memory, a sufficient hard disk capacity for working area, and the like. When a plurality of apparatuses are found to be capable of providing the same function as the apparatus 420, an apparatus having the richest resources is selected as an alternative apparatus 450. Then, the remote start unit 180 makes the same functional components start operating in the alternative apparatus 450 as in the apparatus 420. For example, in a case when the contents database 100 and the database managing unit 140 have been operating in the apparatus 420, the remote start unit 180 sends these components as the database related information 390 to the alternative apparatus 450 and copies the contents database 100 in the apparatus 420 into the alternative apparatus 450. The remote start unit 180 activates the database managing unit 140 in the alternative apparatus 450. In case that the alternative apparatus 450 has no program code for realizing the function of the database managing unit 140, the program code of the database managing unit 140 is transmitted before the activation. Such a remote start mechanism can be realized by using the Java RMI (Remote Method Invocation) or the Remote Procedure Call (RPC) in the Windows system and Unix system. A transmission of a component program code not existing in the alternative apparatus 450 can be realized, for example, by describing the processes to be performed by the components with the Java byte code and sending it via the network to the alternative apparatus 450. Upon completion of the aforementioned operation, the remote start unit 180 sends a remote start completion report 360 to the power monitoring unit 170. Upon reception of the remote start completion report 360, the power monitoring unit 170 resumes the power off process of the apparatus 420.

Embodiment 3

Figure 3:
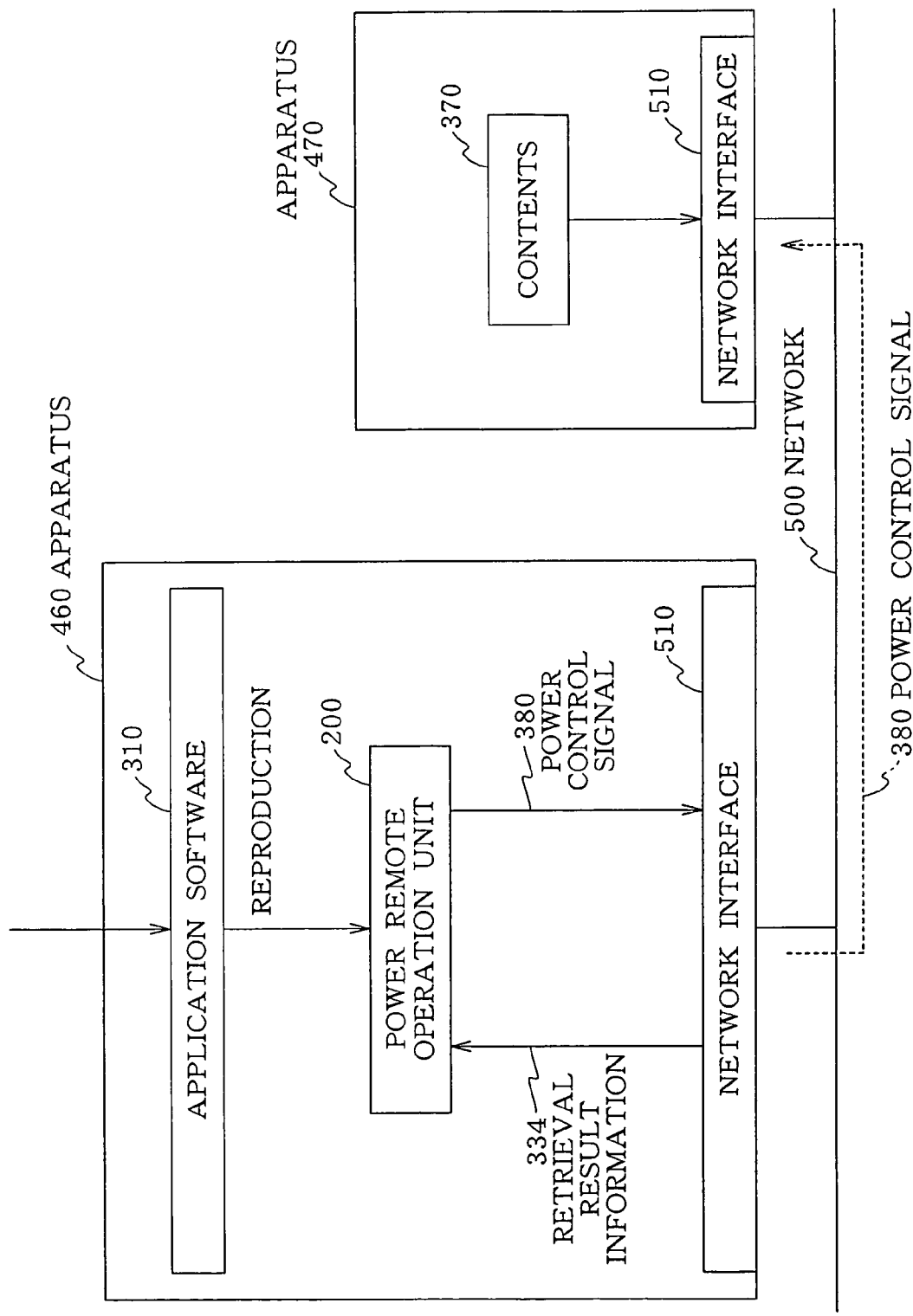
FIG. 3 is a block diagram showing a configuration of a network contents managing system according to a third embodiment of the present invention.

FIG. 3 shows a configuration of a network contents managing system according to a third embodiment of the present invention.

As shown in FIG. 3, the third embodiment of the present invention is equivalent to the first embodiment and the second embodiment augmented by a power remote operation unit 200. Since the third embodiment differs from the first and the second embodiment only in the power remote operation unit 200, explanation will be given on the operation of the power remote operation 200.

When display or reproduction of content 370 is requested by the user application 310, the power remote operation unit 200 operating in the apparatus 460 retrieves the contents database 100 to get the power state of the apparatus 470 according to the location of the contents 370. If the apparatus 470 is off and the apparatus 470 can be turned on via the network, then the power remote operation unit 200 transmits a power control signal 380 to turn apparatus 470 on. Thus, the apparatus 470 is turned on by the power control signal 380 and can display or reproduce the content 370 at another apparatus. The power control via the network can be realized, for example, when the network interface 510 of the apparatus 470 has the wake-on-LAN(Local Area Network) function. When the apparatus 470 is connected by the IEEE1394-1995 network, the power control can be performed by the AV command of the IEEE1394-1995 specification.

When the apparatus 470 cannot be turned on via the network, the power remote operation unit 200 displays a message indicating that the apparatus 470 should be turned on, for example, prompting the user to turn the apparatus 470 on.

Embodiment 4

Figure 4:
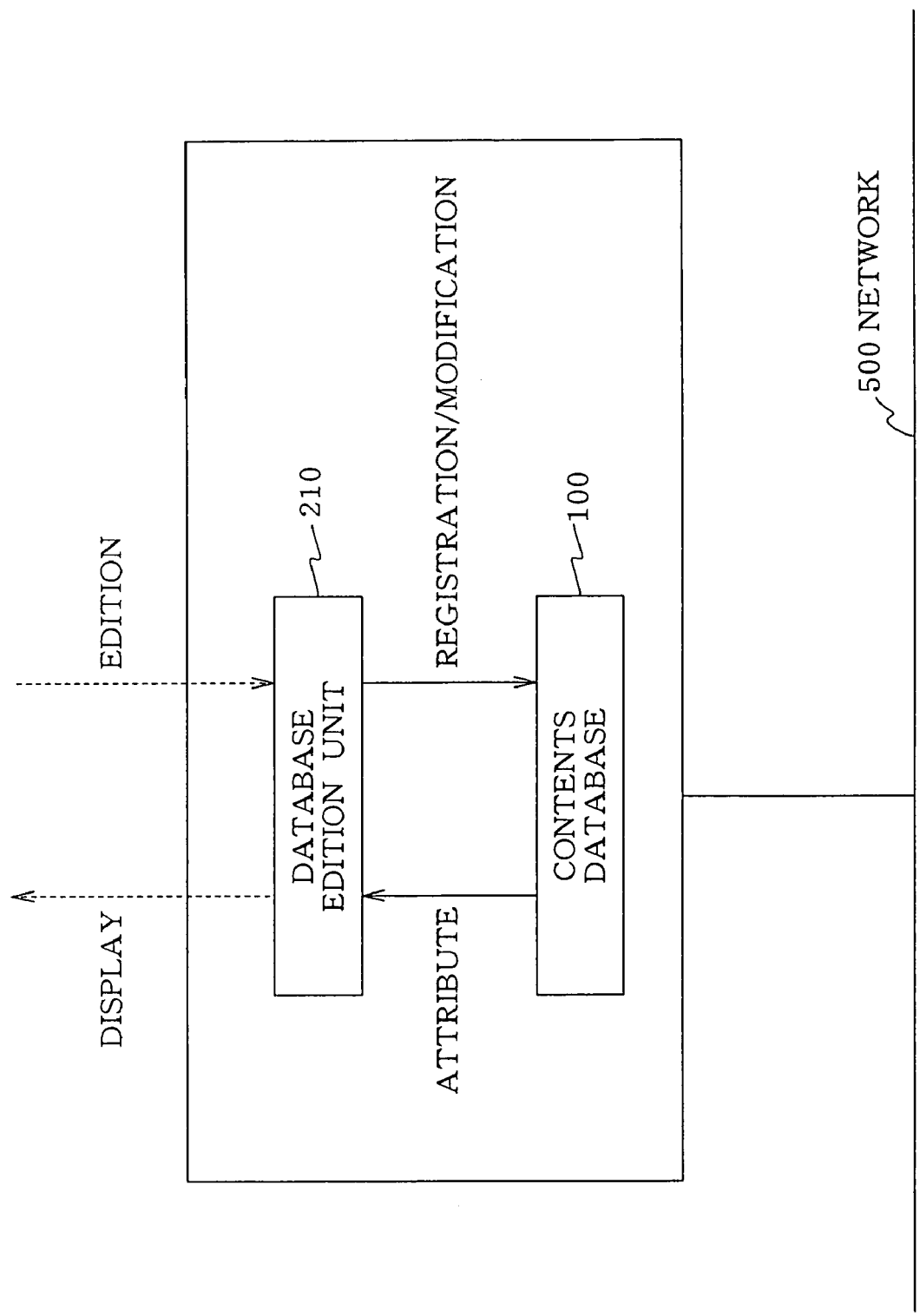
FIG. 4 is a block diagram showing a configuration of a network contents managing system according to a fourth embodiment of the present invention.

FIG. 4 shows a configuration of a network contents managing system according to a fourth embodiment of the present invention.

As shown in FIG. 4, the four the embodiment of the present invention is equivalent to the first, the second, and the third embodiment augmented by a database edition unit 210 to enable the user to edit the database record items. Since the fourth embodiment differs from the first, the second, and the third embodiment only in the database edition unit 210, hereinafter, explanation will be given on the operation of the database edition unit 210.

The database edition unit 210 enables the user to register, delete, and correct database records in the contents database 100. The contents database 100 may be a database file with a format defined in advance so that the database edition unit 210 can specify the filename of the contents database 100, read attributes of the respective database records, and display them. Furthermore, the database edition unit 210 provides a user interface for modifying attributes of the records. For example, the database edition unit 210 provides such an environment that the user can choose and edit a database record attribute item on a table of a record ID number, a content and data recording position, attribute, recording medium ID, and the like.

Figure 5:
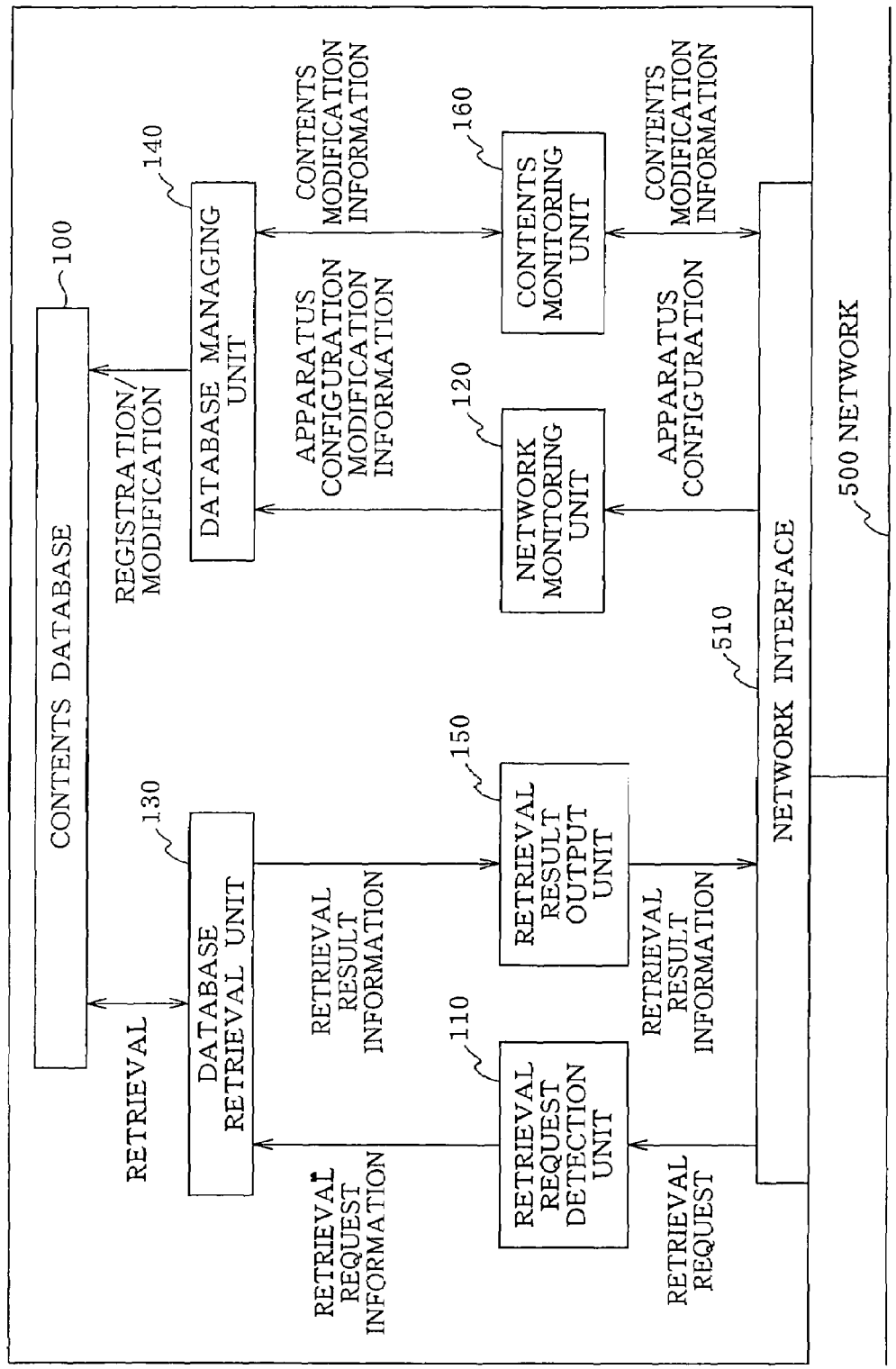
FIG. 5 is a block diagram showing an example configuration of a network contents managing system in which the present invention is realized in a single apparatus.
Figure 6:
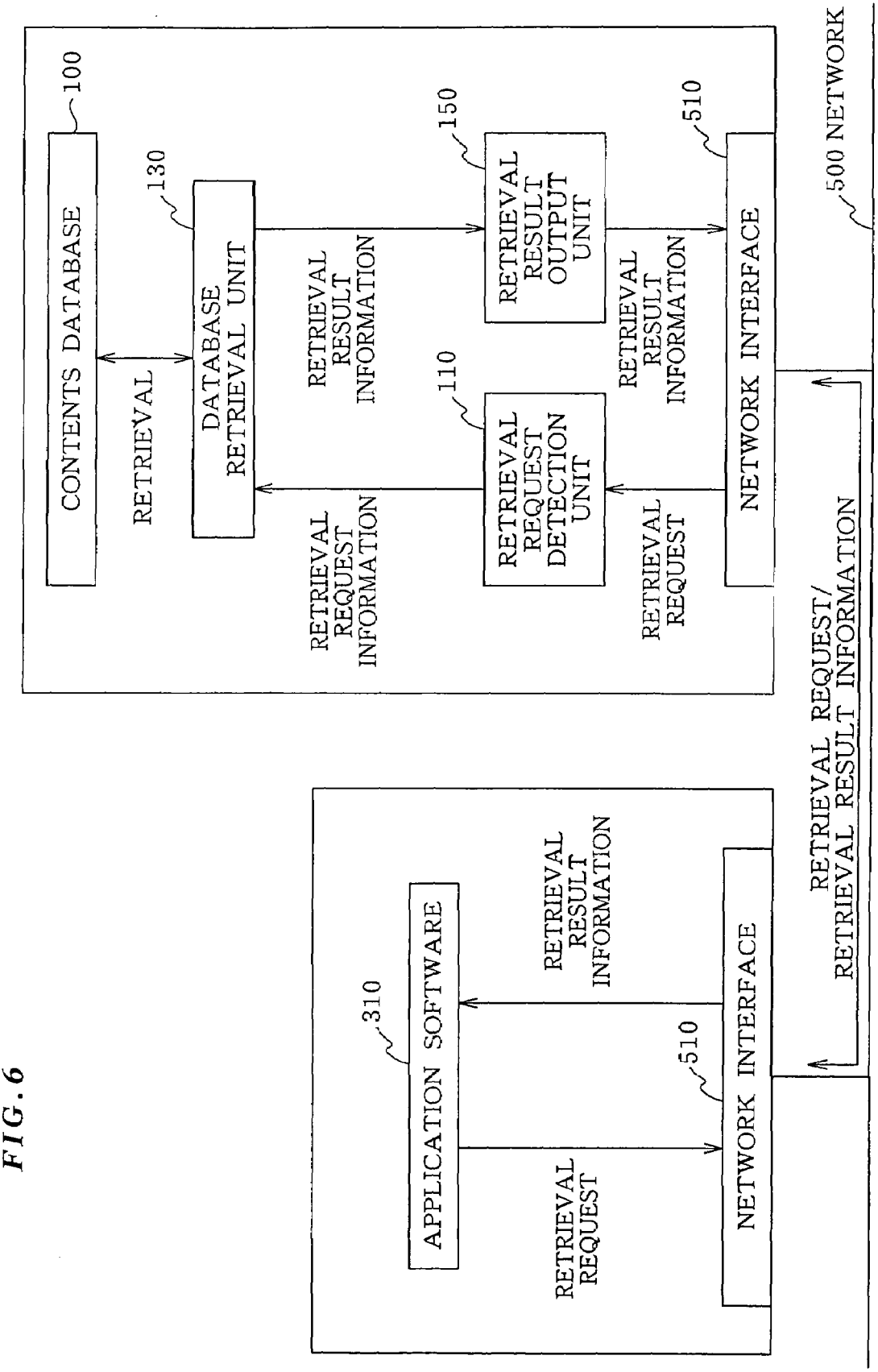
FIG. 6 is a block diagram showing a configuration example of a network contents managing system in which the present invention is realized in a plurality of apparatuses.
Figure 7:
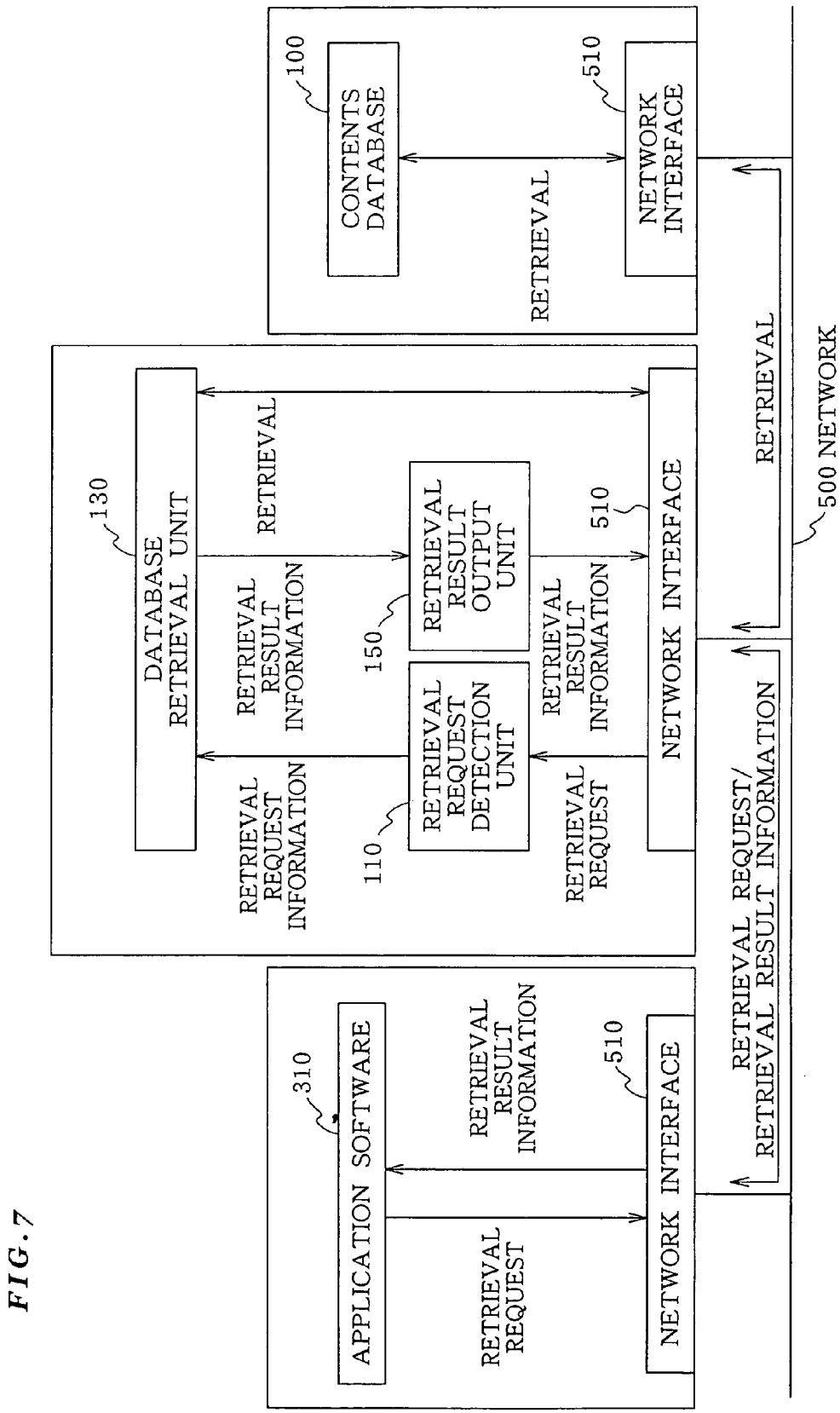
FIG. 7 is a block diagram showing another configuration example of a network contents managing system in which the present invention is realized in a plurality of apparatus.

It should be noted that the network contents-managing system according to the present invention can be applied to a system in which all the components operate in a single apparatus and contents are retained in the same apparatus as shown in FIG. 5 as well as to a system in which components operate in a plurality of apparatuses as shown in FIG. 6 and FIG. 7.

As has been described above, the present invention provides effects as follows.

The network contents managing system according to the present invention used in a network having a personal computer, portable terminals, recording apparatuses, and the like includes: a contents data base, a retrieval request detecting unit, a network monitoring unit, a contents monitoring unit, a database retrieval unit, a database managing unit, and a retrieval result output unit. The contents database enables the retaining of a location and attribute of contents and data stored in different apparatuses connected to the network. The retrieval request detecting unit enables the detection of a retrieval request to the contents database and outputs a retrieval request information. The network monitoring unit enables monitoring of a change of the connection state of the apparatuses to the network and outputs a new apparatus connection state as the connection state information when connection state changes. The contents monitoring unit enables the outputting of a contents modification information when a location and attribute of contents and data is modified by a registration, moving, or deletion of contents and data in any of the apparatuses connected to the network. The database retrieval unit enables, upon reception of the retrieval request information, retrieval of the contents database and outputs a retrieval result information. The database managing unit enables, upon reception of the connection state information and the contents modification information, registration and modification to the contents database. The retrieval result output unit enables output of the retrieval result information and to inform the user who made the request of the retrieval result.

Moreover, the network contents managing system according to the present invention can also output the contents modification information a modification including a recording position and attribute of contents and data caused by mounting/removal of a removable storage medium.

Moreover, in the network contents managing system according to the present invention, the network monitoring unit can also detect a power on/off state of an apparatus connected to the network and retain the state in the contents database.

Moreover, in the network contents managing system according to the present invention including the power monitoring unit and the remote start unit, an apparatus connected to the network can monitor the power on/off operation of the apparatus and at least one of the contents database, the retrieval request detecting unit, the network monitoring unit, the database retrieval unit, the database managing unit, and the retrieval result output unit can be activated through another apparatus connected to the network.

Moreover, the network contents managing system according to the invention includes the contents display reproduction unit and can display or reproduce contents retained in another apparatus connected to the network.

Moreover, the network contents managing system according to the present invention includes the power operation unit for operating the power of another apparatus connected to the network. Accordingly, when the power of another apparatus is off even if the apparatus retains the contents to be displayed or reproduced, it is possible to turn the apparatus on or to notify the user to turn the apparatus on.

Moreover, the network contents managing system according to the present invention includes the database edition unit and accordingly, the contents database can be edited by the user.

The network contents managing system according to the present invention having the aforementioned configuration enables retrieving a location and the usable/unusable state of contents and data in a network having a personal computer, portable terminals, recording apparatuses, and the like, regardless of contents and data recording, movement, and deletion in apparatuses connected to the network, connection/disconnection of an apparatus to/from the network, power on/off of an apparatus connected to the network, and mounting/removal of a removable storage medium containing contents and data.

Moreover, with the network contents managing system according to the present invention, even in a network such as a home network in which an apparatus retaining contents and data may not be always turned on and a removable storage medium may be used, the user can obtain a list of all the contents and data stored in her/his home.

Furthermore, even when an apparatus having components operating according to the present invention is turned off, the function of the network contents managing system of the present invention can be continued if another apparatus takes over the functions of the apparatus turned off. Thus, even if the user abruptly turns off an apparatus connected to the network, it is possible to retain the service provided by the network contents managing system of the present invention. This eliminates the problem that a specific apparatus should always operate or the user cannot retrieve contents and data when an apparatus becomes unusable by accident.

Furthermore, since the user can edit the contents database, the user can add and correct for the respective attributes of the contents database records and can add contents and data which have been stored in an apparatus before the apparatus is connected to the network.

Because the present invention can be applied to various system configurations, even when apparatuses is connected to the network one by one, it is possible to manage the contents only by installing a minimum component into a newly connected apparatus and to utilize the contents which have been stored in the newly connected apparatus before its connection.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-334621 (Filed on November 25, 1999) including specification, claims, drawings and summary are incorporated herein by reference in its entirety.

What is claimed is:

1. A network contents managing system comprising:
   a plurality of apparatuses connected to a network wherein each apparatus of the plurality of apparatuses comprises a contents file and a contents monitoring unit that outputs contents modification information to the network when the apparatus modifies the contents file;
   one of said plurality of apparatuses comprising a contents database, a database managing unit, a network monitoring unit, a power monitoring unit, a remote start unit, a retrieval result output unit, and a power operation unit;
   the contents database retaining accessibility information for each of the contents files of the plurality of apparatuses;
   the network monitoring unit that monitors a change in connection state to the network of at least one of the apparatuses of the plurality of apparatuses and outputs to the plurality of apparatuses on the network a new apparatus connection state as connection state information when the connection state of the apparatus changes;
   the power monitoring unit for monitoring a power operation of at least one apparatus of the plurality of apparatuses connected to the network;
   the remote start unit for activating at least one of the contents database, a retrieval request detection unit, the network monitoring unit, a database retrieval unit, the database managing unit, and a retrieval result output unit at another apparatus of the plurality of apparatuses connected to the network; and
   the power operation unit for operating a power of another apparatus of the plurality of apparatuses connected to the network, wherein said database managing unit updates the contents database according to the contents modification information, and the database managing unit further updates the contents database according to the connection state information.

2. A network contents managing system as claimed in claim 1, wherein the contents monitoring unit further outputs the contents modification information when retained information is modified as a result of a mounting/removing of a removable medium.

3. A network contents managing system as claimed in claim 1, wherein the network monitoring unit detects a power on/off of the plurality of apparatuses connected to the network and retains in the contents database retained information reflecting the power on/off of the plurality of apparatuses connected to the network.

4. A network contents managing system as claimed in claim 1, the system further comprising a database edition unit for enabling a user to edit the contents database.

5. A network contents managing system as claimed in claim 1, wherein:
   the contents database associates the content file with an apparatus identification number, and retains the apparatus identification number while including apparatus usable state data with the apparatus identification number; and
   the database managing unit performs registration and modification to the contents database upon receipt of connection state information and the contents modification information.

6. A network contents managing system as claimed in claim 5, wherein the database managing unit changes the apparatus usable state data not shown in the connection state to be unusable.

7. A network contents managing system as claimed in claim 5, wherein the database managing unit changes the apparatus usable state data of the information including the apparatus identification number shown in the connection state to be usable.

8. The network contents managing system as claimed in claim 1, wherein the contents monitoring unit further outputs the contents modification information when retained information is modified as a result of a mounting/removing of a removable medium.

9. The network contents managing system as claimed in claim 1, wherein the network monitoring unit detects a power on/off of the plurality of apparatuses connected to the network and retains in the contents database retained information reflecting the power on/off of the plurality of apparatuses connected to the network.

10. The network contents managing system as claimed in claim 2, wherein the network monitoring unit detects a power on/off of the plurality of apparatuses connected to the network and retains in the contents database the retained information reflecting the power on/off of the plurality of apparatuses connected to the network.

11. The network contents managing system as claimed in claim 8, wherein the network monitoring unit detects a power on/off of the plurality of apparatuses connected to the network and retains in the contents database the retained information reflecting the power on/off of the plurality of apparatuses connected to the network.

12. The network contents managing system as claimed in claim 10, the system further comprising a power monitoring unit for monitoring a power operation of at least one apparatus of the plurality of apparatuses connected to the network and a remote start unit for activating at least one of the contents database, a retrieval request detection unit, the network monitoring unit, a database retrieval unit, the database managing unit, and a retrieval result output unit at another apparatus of the plurality of apparatuses connected to the network.

13. The network contents managing system as claimed in claim 1, the system further comprising a power operation unit for operating a power of another apparatus of the plurality of apparatuses connected to the network.

14. The network contents managing system as claimed in claim 1, the system further comprising a power operation unit for operating a power of another apparatus of the plurality of apparatuses connected to the network.

15. The network contents managing system as claimed in claim 2, the system further comprising a power operation unit for operating a power of another apparatus of the plurality of apparatuses connected to the network.

16. The network contents managing system as claimed in claim 8, the system further comprising a power operation unit for operating a power of another apparatus of the plurality of apparatuses connected to the network.

17. The network contents managing system as claimed in claim 3, the system further comprising a power operation unit for operating a power of another apparatus of the plurality of apparatuses connected to the network.

18. The network contents managing system as claimed in claim 9, the system further comprising a power operation unit for operating a power of another apparatus of the plurality of apparatuses connected to the network.

19. The network contents managing system as claimed in claim 1, the system further comprising a database edition unit for enabling a user to edit the contents database.

\* \* \* \* \*